B. S. WILLIAMS.
HYDRAULIC POWER TRANSMISSION SYSTEM FOR WHEELED VEHICLES.
APPLICATION FILED NOV. 18, 1912.
1,100,004.
Patented June 16, 1914.
2 SHEETS—SHEET 2.
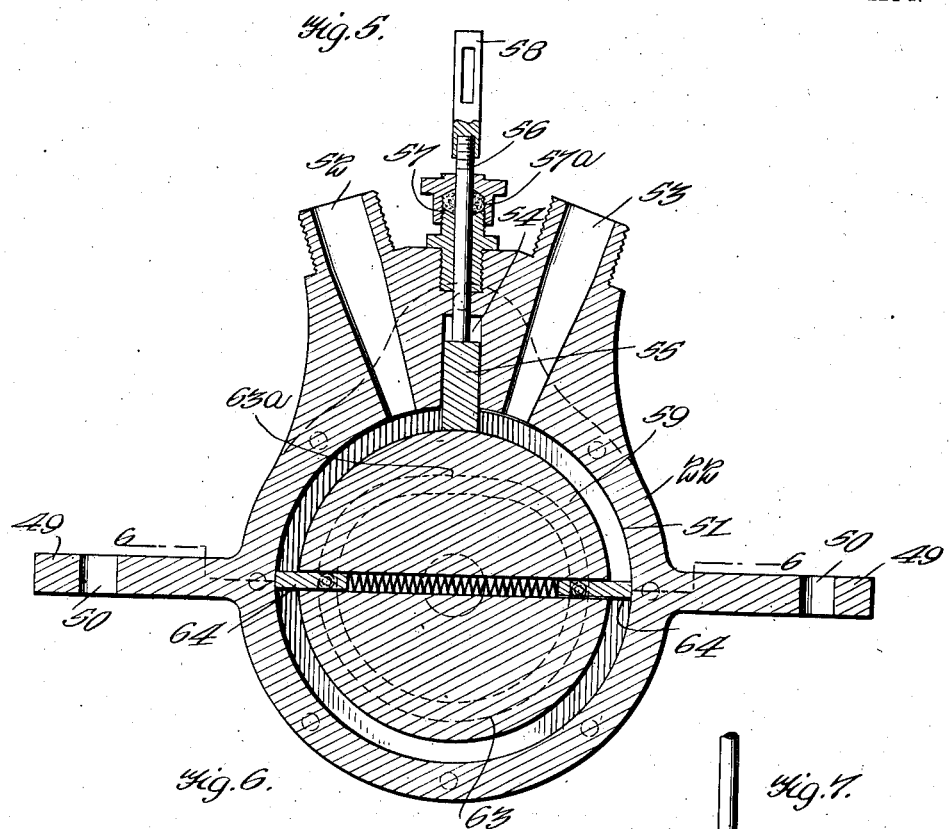
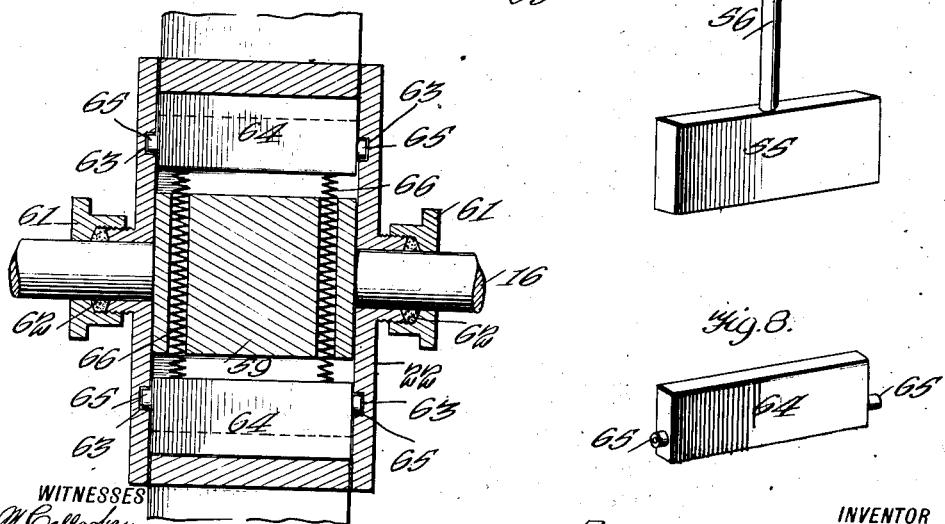
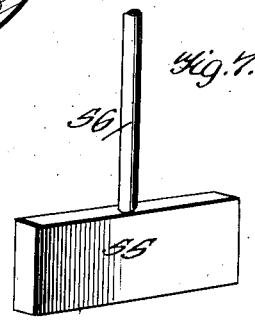
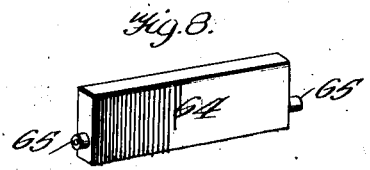
INVENTOR
BENJAMIN S. WILLIAMS,
BY Munn & Co.
ATTORNEYS

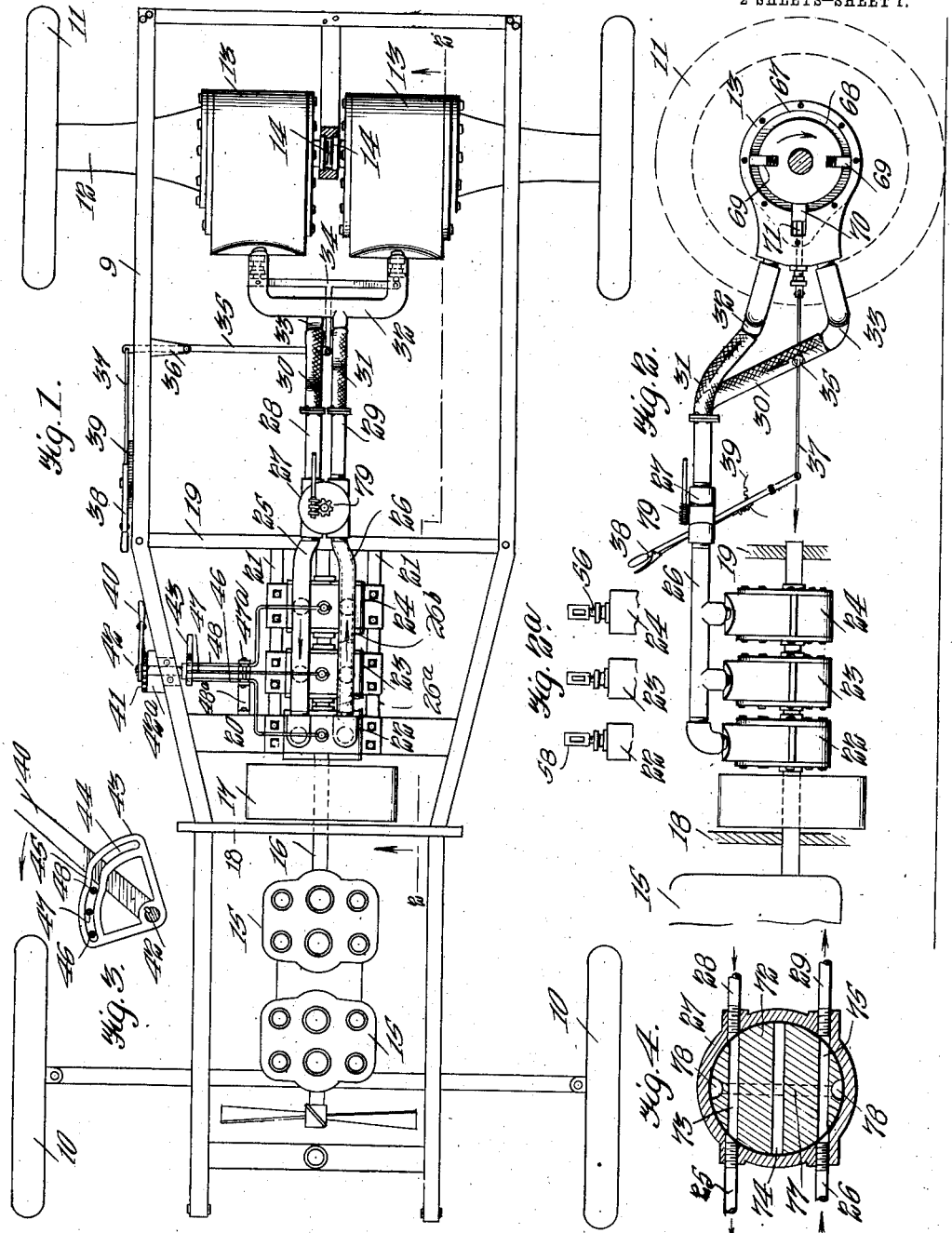

UNITED STATES PATENT OFFICE.

BENJAMIN S. WILLIAMS, OF NASHVILLE, TENNESSEE, ASSIGNOR TO WILLIAMS AUTOMOBILE TRANSMISSION COMPANY, OF NASHVILLE, TENNESSEE, A CORPORATION OF TENNESSEE.

HYDRAULIC POWER-TRANSMISSION SYSTEM FOR WHEELED VEHICLES.

1,100,004. Specification of Letters Patent. Patented June 16, 1914.

Application filed November 18, 1912. Serial No. 731,966.

*To all whom it may concern:*

Be it known that I, BENJAMIN S. WILLIAMS, a citizen of the United States, and a resident of Nashville, in the county of Davidson and State of Tennessee, have invented certain new and useful Improvements in Hydraulic Power-Transmission Systems for Wheeled Vehicles, of which the following is a specification.

My invention relates to transmission gearing and more particularly to transmission gearing suitable for wheeled vehicles of the type in which the liquid conveys the power from a driving shaft to a driven shaft.

Among the purposes of my invention are the following:—I. To enable the operator to use a number of separate driving units or pumps connected with driven units and by throwing the driving units into action one at a time to vary the pressure and volume of the liquid as transmitted to the driven units. II. To enable the operator to reverse the direction of travel of the liquid as between the driving units and the driven units—the reversal taking place as to all of the units which happen to be in action at the time. III. To eliminate the necessity for differential gears, transmission gears, truss rods, clutch, knuckle joints, driving shafts, cog members, and various metallic transmission members. IV. To improve various parts used in connection with systems of the kind above mentioned for the purpose of improving the general efficiency thereof.

Reference is made to the accompanying drawings forming a part of this specification and in which like letters indicate like parts.

Figure 1 is a plan view of an automobile driving mechanism equipped with my improved transmission gearing; Fig. 2 is a fragmentary vertical section through the same; Fig. 2$^a$ is a fragmentary side elevation showing the upper ends of the driving units; Fig. 3 is a detail showing a part of the mechanism used for throwing the driving units one at a time into and out of action; Fig. 4 is a detail view showing a horizontal section through the reversing valve; Fig. 5 is a vertical section through one of the driving units or pumps; Fig. 6 is a section through the mechanism shown in Fig. 5 and is taken in a plane at right angles to said figure; Fig. 7 is a detail showing in perspective one of the abutments used in the driving units or pumps; Fig. 8 is a detail showing one of the pistons used in the driving units.

The vehicle frame is shown at 9, the front wheels at 10, and the rear wheels at 11. Associated with the rear wheels 11 are two axle casings 12, the latter being secured upon two motors or driven units 13, each of the latter being in the nature of a rotary hydraulic motor. Each of these driven units is provided with a revoluble axle section 14, these two axle sections extending through the axle casings 12 and carrying the rear wheels which are rigid upon them. The engine is shown at 15 and is provided with an engine shaft 16 which carries a fly wheel 17. The vehicle frame is provided with cross bars 18, 19, 20, and between the bars 19, 20, are forwardly extending beams 21. Mounted upon these beams are a number of driving units 22, 23, 24, each being in the nature of a rotary hydraulic pump. Connected with the driving units 22, 23, 24, for conveying a motor liquid to and from the same are pipes 25, 26. The pipe 26 will be provided with check valves 26$^a$, 26$^b$, to prevent the units 22, 23, and 24 from back pressure of one to the other. That is to say, when only one or two are in action, material will not be forced through the units not in action. These pipes are connected to a reversing valve 27. Connected with this valve are two pipe sections 28, 29, which are rigid, and connected with these pipe sections are two other pipe sections 30, 31, which are flexible. The pipe section 31 is connected to a Y-piece 32, the latter at its outer ends being connected with the driven units 13. The flexible pipe section 30 is connected with a Y-piece 33, the latter at its outer ends also being connected with the driven units, 13. For the purpose of controlling the flow of liquid into and out of the driven units 13, I provide a T bar 34 which is pivotally connected to a lever 35, the latter being journaled upon a bracket 36 carried by the vehicle frame 9.

Pivotally connected with the outer end of the lever 35 is a rod 37 which is also pivotally connected to a hand lever 38. This lever is adapted to be turned or rocked into different angular positions and is provided with a quadrant or sector 39 for the convenience of the operator in shifting the hand lever into different positions and retaining it in such positions. I provide another hand lever 40 and sector 41, the hand lever 40 being mounted rigidly upon the end of the rocking shaft 42, the sector being carried by the bracket 42ᵃ which is rigid upon the vehicle frame. The rocking shaft 42 carries a cam 43, the latter having a slot 44 of a general arcuate form as will be understood from Fig. 3. The slot 44 is provided with a slight bend 45. Extending into this slot 44 are the ends of the three levers 46, 47, 48, the levers 46 and 48 being bent as indicated in Fig. 1, the lever 47 being straight.

Carried by the cross bar 20 is a bracket 48ᵃ and mounted upon the latter is a pivot pin 47ᵃ upon which the levers 46, 47, 48 are mounted and free to rock. Each driving unit 22, 23, 24, is provided with supporting flanges 49, having bolt holes 50 through which extend bolts. The three driving units are alike in construction and may be understood from a description of the driving unit numbered 22 and shown more particularly in Figs. 5, 6, 7 and 8. Each driving unit is provided with a compartment 51 of cylindrical form and with openings 52, 53, the inner ends of which merge into the compartment 51 and serve as ports. The unit is further provided with a slot 54 and slidably mounted within the latter is an abutment 55. Extending upwardly from this abutment is a stem 56 which is rendered fluid-tight by aid of a packing nut 57 and packing 57ᵃ. The upper end of the stem 56 carries an eye 58 so that by raising and lowering the stem 56 by aid of this eye the abutment 55 is raised or lowered. The several abutments of the driving units are independent of each other—at least to the extent that one may be raised or lowered without at the same time raising or lowering the others. Located within the compartment 51 is a rotor 59 having a cylindrical form so that the peripheral surface of this rotor is concentric to the peripheral surface or boundary of the compartment 51. Upon each side of the driving unit are two packing nuts 61 and packings 62 for the purpose of rendering the device fluid-tight. These packings may be of any desired form suitable for the purpose. At 63 are two cam grooves, the form of which is nearly but not quite annular, each groove being provided with a comparatively straight portion 63ᵃ as will be understood from Fig. 5. The rotor 59 carries two pistons 64, each having the form of a slide and provided at its ends with guide rollers 65. These guide rollers extend into the cam grooves 63 so that as the rotor 59 turns the slides 64 are each forced inwardly and outwardly in relation to the center of rotation. The form of the cam grooves is such that when each piston 64 approaches the upper limit of its travel it moves nearly straight across following a path approximating the direction of the portion 63ᵃ as shown in Fig. 5. Two springs 66 extend diametrically through the middle portion of the rotor and press against the piston 64 as will be understood from Fig. 6. These springs by pressing the pistons outwardly tend to maintain them fluid-tight relatively to other parts.

Referring more particularly to Fig. 5, the action of the driving unit may be readily understood. When the rotor 59 is turned by the engine shaft, the pistons 64 are carried around and as they thus travel they cause the circulation of the liquid. The abutment 55 is normally stationary and is used merely to throw the unit into and out of action. Each time one of the pistons 64 approaches the abutment 55 the piston moves slightly inward or toward the center of rotation and thus passes under the abutment 55. As there are two of the pistons 64, the fact that one of them is idle while passing the abutment 55 does not interfere materially with the work of the other piston. One or the other of the two pistons is always effective while the engine is in action. Whenever the abutment 55 is raised, the rotor 59 turns idly and has no tendency to cause the circulation of the liquid into and out of the unit.

The driven units 13 are of substantially the same construction as the driving units above described, the only difference being that they are in this instance made somewhat larger and occupy different positions relatively to the parts which support them. As will be understood from Figs. 1 and 4, the driven units 13 are disposed horizontally rather than vertically reckoning from a plane passing through the greatest dimenison of each unit. The compartment 68, bounded by the wall 67, the pistons 69, and the abutment 70, correspond in structure to the analogous parts above described in connection with Figs. 5 to 8 inclusive. Each driven unit 13 is provided with a stem 71 corresponding in structure and action to the stem 56 shown at the top of Fig. 5. The two stems 71 of the driven units 13 are connected with the ends of the T bar 34.

The reversing valve 27 is provided with a revoluble plug 72. This plug is provided with a number of longitudinal passages 73, 74, 75, parallel with each other and with another passage 77 which crosses the passages 73, 74 and 75, and is located lower than the same. The passage 77 is provided with upwardly extending portions 78 which are located in the same plane as the passages 73, 74, 75.

The valve plug 72 may be turned or rotated to the extent of 90 degrees or one-quarter of a revolution. With the valve 72 in the position indicated in Fig. 4, the pipe section 28 is connected through the passage 73 with the pipe section 25 and the pipe section 29 is similarly connected through the passage 75 with the pipe section 26. If, however, the valve plug 72 be rotated to the extent of 90 degrees say in a clockwise direction, the passages 73 and 75 are thrown out of registry with the pipe sections. The passage 74 extends obliquely across from the pipe section 25 to the pipe section 29 and the passage 77 also extends obliquely across from the passage 28 to the passage 26. If now the valve plug 72 be rotated back into its original position, the connections are restored, the parts again assuming the positions indicated in Fig. 4. Thus by turning the valve 72 a quarter of a revolution the pipe sections shown in Fig. 4 are virtually crossed so that a liquid first passing from the pipe section 28 through the valve into the pipe section 25 now passes from the pipe section 28 into the pipe section 26. Similarly, the liquid passing from the pipe section 26 through the valve plug and into the pipe section 29 now crosses over and passes into the pipe section 28. The reversing valve 27 is provided with a worm gearing 79 to facilitate the turning of the valve plug.

The driven units and the connecting pipes are filled with a liquid preferably oil which furnishes the medium for transmitting the energy from the driving units to the driven units.

In shifting the hand lever 40 forward or backward so that the portion 45 of the slot 44 receives any one of the levers 46, 47, 48, the lever in question is raised or lowered gradually depending upon the slope of the portion 45 of the slot. The operator, therefore, by a skilful handling of the lever 40, may lift each one of the levers 46, 47, 48, very gradually. In doing this, he causes the particular driving unit thus effective to apply only a portion of the power of which it is capable of exerting. For instance, if the lever 40 be so handled as to raise the abutment 55, shown in Fig. 5 for the distance equal to one-half of the full effective distance of travel of the abutment, the driving unit will cause a circulation of liquid equal in volume to substantially one-half of the amount of liquid it would cause to circulate if the abutment were lowered to its limit of travel. Therefore as the hand lever 40 is pressed slowly forward the speed of the machine is increased gradually and this increase of speed is in direct inverse ratio to that exerted upon the rear wheels 11. In this relation my device serves all purposes of a speed changing gear. It also dispenses with the necessity for a clutch. Thus when the lever 40 is in a backward position all members 55 are up which will allow the engine to run and have no effect on units 22, 23, 24, as a pumping device. However, as the lever 40 is pressed forward the units 22, 23, 24, begin pumping and thus will cause the car to begin moving.

The operation of my device is as follows: The parts being arranged and assembled as above described and a suitable quantity of liquid preferably oil being placed in the various pipes, driving units, and driven units, so as to completely fill the system, the valve 27 is adjusted, say into the position indicated in Fig. 4 and the engine is started up. The hand lever 40 normally occupies the position indicated in Figs. 1 and 3. The levers 46, 47, 48 are therefore down and the abutments 55 are in their respective uppermost positions. The lever 40 is now swung forwardly so that the lever 48 is raised and the corresponding abutment 55 is forward. This throws the driving unit 24 into action. If the hand lever be pressed still farther forward the driving units 23 and 22 are successively thrown into action. The hand lever 38 being actuated the T bar 34 is drawn backwardly so as to throw the driven units 13 into action. The oil now passes in the direction indicated by the arrows in Fig. 1 so that the rear wheels 11 are turned by the driven units 13 and the vehicle is propelled accordingly.

If slow speed and high power be desired, only one of the driving units is thrown into action. If greater speed and less power be desired two or three of the driving units are brought into play. This is upon the principle that the total available power of the engine is distributed as between 1, 2 or 3 of the driving units, the amount of liquid thus circulating being greater as the number of driving units is increased and the pressure of the liquid being correspondingly diminished. To climb a hill the entire power of the engine is thrown upon one of the driving units whereas if the engine is to rotate rapidly upon a level road all of the driving units are brought into play.

With this apparatus no differential gears are required. The axle sections 14 being independent of each other and separately driven by the driven units 13, the rotation of the wheels 11 is in the aggregate commensurate with the amount of liquid passing through both of the driven units 13. Since, however, the distribution of liquid as between these two driven units may vary according to the resistance to rotation encountered by the two rear wheels 11, one of these wheels can turn faster than the other. The vehicle is thus well adapted for turning curves, the rear wheels acting in a manner analogous to that in which they would act if they were controlled by differential gearing.

The driven units 13, under control of the hand lever 38, may be used as a hydraulic brake, and in this relation are adapted for controlling the speed of the vehicle when it tends to run down hill by the action of gravity. That is to say, as the vehicle tends to run down hill the driven units 13 offer resistance and will serve to pump oil through the entire system, whereas if the member 70 is drawn forward it will serve to minimize all resistance and allow the car to coast freely. As in the first instance, the member 70 will serve as a brake and in other instance will serve to save power as the engine may be cut off and the circulation of liquid stop.

I do not limit myself to the precise construction shown as variations may be made therein without departing from the spirit of my invention.

What I claim as new and desire to secure by Letters Patent is as follows:—

1. A power transmission system comprising a plurality of hydraulic driving units, a plurality of hydraulic driven units, pipe connections extending from said driven units to all of said driving units, a sliding abutment for each driving unit for the purpose of controlling the flow of liquid therethrough, a lever connected with each sliding abutment for the purpose of adjusting the same in order to increase or diminish the flow of said liquid, a cam provided with a slot through which said levers extend, and means controllable at the will of the operator for moving said cam in order to shift said levers.

2. A power transmission system for wheeled vehicles including a pair of hydraulic driven units, revoluble axles connected with said driven units, wheels mounted upon said axles, a plurality of hydraulic driving units, a sliding abutment for each driving unit, a lever for each sliding abutment, a cam provided with a slot through which said levers extend, and means for rocking said cam.

3. A power transmission system for wheeled vehicles comprising a vehicle frame, a plurality of shaft sections carried by said frame and revoluble relatively to the same, a wheel mounted upon each shaft section, a plurality of hydraulic driven units each connected with a shaft section, a plurality of hydraulic driving units, connections from said driving units to said driven units for the purpose of conveying fluid from said driving units to said driven units, a sliding abutment mounted within each driven unit for the purpose of controlling the flow of liquid within the same, and mechanism connected with all of said sliding abutments and controllable at the will of the operator for actuating said sliding abutments.

4. A power transmission system for wheeled vehicles comprising a vehicle frame, a pair of shaft sections journaled upon said vehicle frame and disposed in alinement with each other, a wheel carried by each shaft section and adapted to engage the ground for the purpose of propelling the vehicle, a hydraulic driven motor for each of said shaft sections, a sliding abutment mounted within each hydraulic driven motor for controlling the flow of a liquid through the same, means controllable at the will of the operator for adjusting said sliding abutments so as to control the flow of liquid through both of said hydraulic driven units, the speed of rotation of each driven unit being controllable in part by the resistance to rotation offered by the wheel engaging the ground and in part by the position of the sliding abutment for said last mentioned unit so that the shaft sections may turn at different rates of speed, and a motor mechanism for forcing a fluid through said hydraulic driven units.

5. A power transmission system comprising a plurality of hydraulic driving units, a plurality of hydraulic driven units, pipe connections extending from said driven units, to all of said driving units, a sliding abutment for each driving unit for the purpose of controlling the flow of liquid therethrough, a lever connected with each sliding abutment for the purpose of adjusting the same in order to increase or diminish the flow of said liquid, and means for actuating said levers in a predetermined order of succession.

6. A power transmission system for wheeled vehicles including a pair of hydraulic driven units, revoluble axles connected with said driven units, wheels mounted upon said axles, a plurality of hydraulic driving units, a sliding abutment for each driving unit, a lever for each sliding abutment, a cam provided with a slot through which said levers extend, and means for rocking said cam.

7. A transmission system for wheeled vehicles including a pair of hydraulic driven units, revoluble axles connected with said driven units, wheels mounted upon said axles, a plurality of hydraulic driving units, a sliding abutment for each driving unit and means for successively shifting the abutments at the will of the operator.

8. The combination with an automobile, of a driving mechanism therefor, including a plurality of hydraulic driving elements, a sliding abutment for each driving unit, means for successively shifting the sliding abutments at the will of the operator, and means actuated by the driving elements for propelling the automobile.

BENJAMIN S. WILLIAMS.

Witnesses:
 WALTON HARRISON,
 R. T. BASSETT.